United States Patent [19]

Blackburn et al.

[11] 4,357,832
[45] Nov. 9, 1982

[54] DIGITAL ELECTRONIC BALANCING APPARATUS

[75] Inventors: Bobby J. Blackburn; John M. Csokmay, both of Columbus, Ohio

[73] Assignee: IRD Mechanalysis, Inc., Columbus, Ohio

[21] Appl. No.: 189,904

[22] Filed: Sep. 22, 1980

Related U.S. Application Data

[63] Continuation of Ser. No. 31,702, Apr. 20, 1979, abandoned.

[51] Int. Cl.³ ............................................. G01M 1/22
[52] U.S. Cl. ...................................... 73/462; 364/508
[58] Field of Search .................................. 73/462–465; 364/463, 508

[56] References Cited

U.S. PATENT DOCUMENTS

| | | | |
|---|---|---|---|
| 2,722,830 | 11/1955 | Federn et al. | 73/66 |
| 3,106,846 | 10/1963 | Hack | 73/463 |
| 3,280,638 | 10/1966 | Hack | 73/462 |
| 3,336,809 | 8/1967 | Hack | 73/462 |
| 3,681,967 | 8/1972 | Hines et al. | 73/462 |
| 3,774,115 | 11/1973 | Greiner | 328/36 |
| 3,890,845 | 6/1975 | Mueller | 73/462 |
| 3,938,394 | 2/1976 | Morrow et al. | 73/462 |
| 4,015,480 | 4/1977 | Giers | 73/462 |
| 4,090,244 | 5/1978 | Altwein | 364/603 |
| 4,109,312 | 8/1978 | Beutel | 364/508 |
| 4,154,112 | 6/1979 | Hoffmann | 73/462 |
| 4,182,185 | 1/1980 | Forster | 73/462 |

FOREIGN PATENT DOCUMENTS 2191727 7/1972 France .

Primary Examiner—James J. Gill
Attorney, Agent, or Firm—Mueller and Smith

[57] ABSTRACT

Electronic balancing apparatus for rotating bodies in which unbalance read-out for two-plane dynamic balancing can be obtained on an initial run without the need for trial weights or calibration runs, and wherein manual filter tuning, manual ranging of amount displays and manual entry of right and left calibration weights are eliminated. In addition, the system will automatically divide correction weights between two points on a rotor, will combine multiple corrections into one weight, and incorporates memory meters which hold their readings from run-to-run without adjustment.

15 Claims, 6 Drawing Figures

DIGITAL ELECTRONIC BALANCING APPARATUS

This is a continuation of application Ser. No. 31,702 filed on Apr. 20, 1979, now abandoned.

BACKGROUND OF THE INVENTION

As is known, in two-plane balancing of rotating bodies, it is necessary to make some provision for the elimination of cross-effect and to provide a method for accurately calibrating the analyzing instrument. In this respect, it is necessary to make some provision for assuring that the unbalance in one correction plane does not enter into the unbalance indication for the other correction plane.

In early electronic balancing devices, calibration could be achieved only after a laborious procedure involving a number of trial runs and the use of trial weights on the rotating body. Subsequently, balancing apparatus was developed in which the unbalance readout for two-plane dynamic balancing could be obtained on an initial run without the need for trial weights. Such systems, however, require a number of manual manipulations by the operator such as manual filter tuning to adjust the filter in the balancing equipment to correspond to the speed of rotation of the rotating body and manual entry of right and left calibration weights determined during the calibration procedure.

SUMMARY OF THE INVENTION

In accordance with the present invention, new and improved electronic balancing apparatus is provided wherein a vibration signal derived from a rotating body is compared in phase with a reference signal to determine the angular position of a point of unbalance on the rotating body. Specifically, the invention provides circuitry responsive to both the reference and vibration signals for producing two signals each having a magnitude proportional to two right-angle vectors whose vector sum is equal to a single vector representative of the magnitude of the vibration signal and located at an angle about a center point corresponding to the angular position of said point of unbalance. The two signals proportional to the two right-angle vectors are then applied to computer means which incorporates apparatus for displaying the magnitude and angular position of the single vector.

Preferably, the means for producing the two signals proportional to two right-angle vectors comprises two analog multipliers to which are applied the aforesaid vibration signal. Applied to one of the two multipliers is a signal represented by $V \sin \omega t$ and applied to the other multiplier is a signal represented by $V \cos \omega t$ where $\omega$ is the rotational velocity of the rotating body. The sine and cosine signals are derived through digital techniques from a reference pulsed signal in which the pulses have a repetition frequency corresponding to the rotational speed of a body being balanced.

The above and other objects and features of the invention will become apparent from the following detailed description taken in connection with the accompanying drawings which form a part of this specification, and in which.

Figure 2:
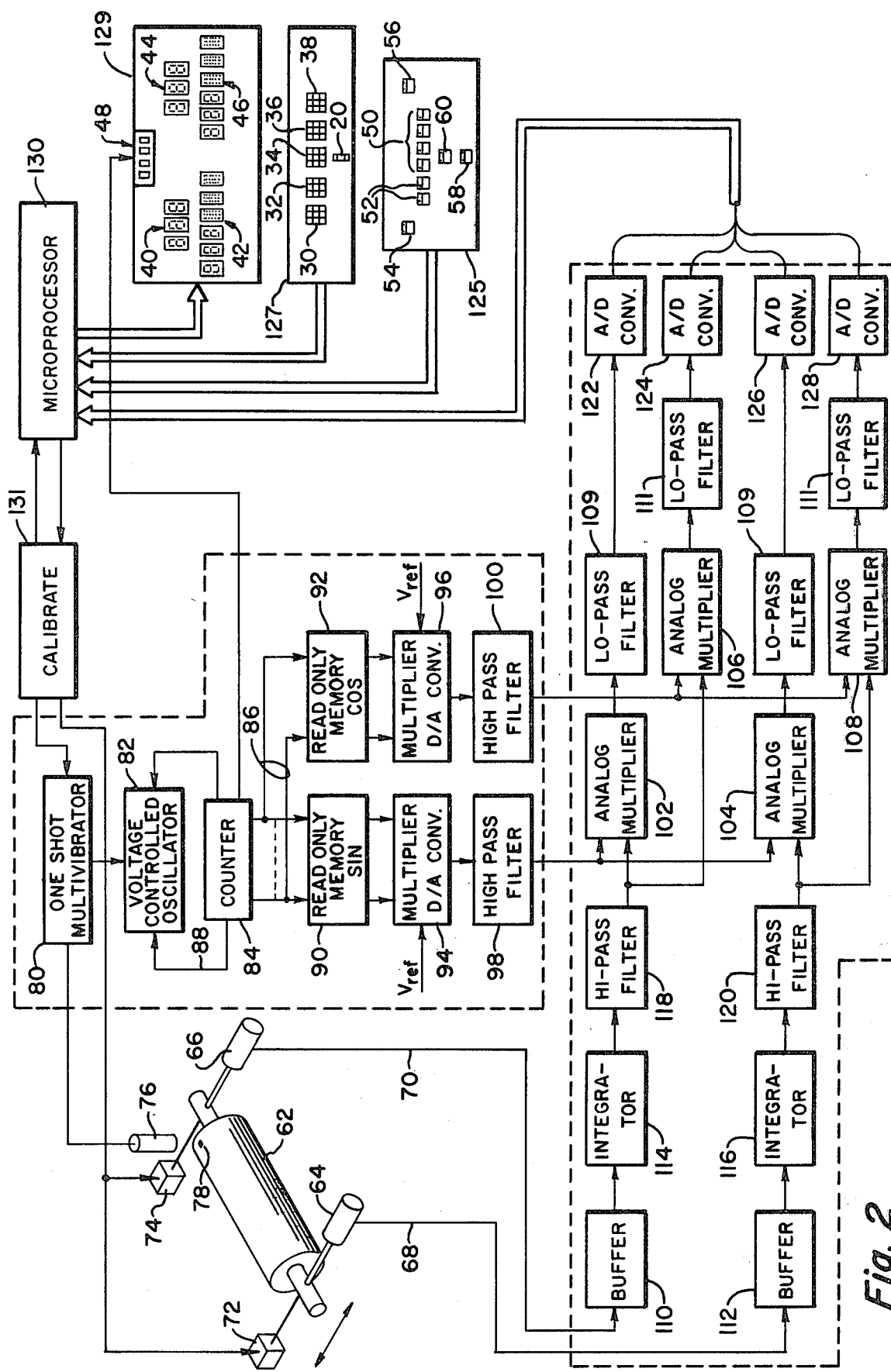
FIG. 2 is a block schematic circuit diagram of the vibration analyzing apparatus of the invention.
Figure 3A:
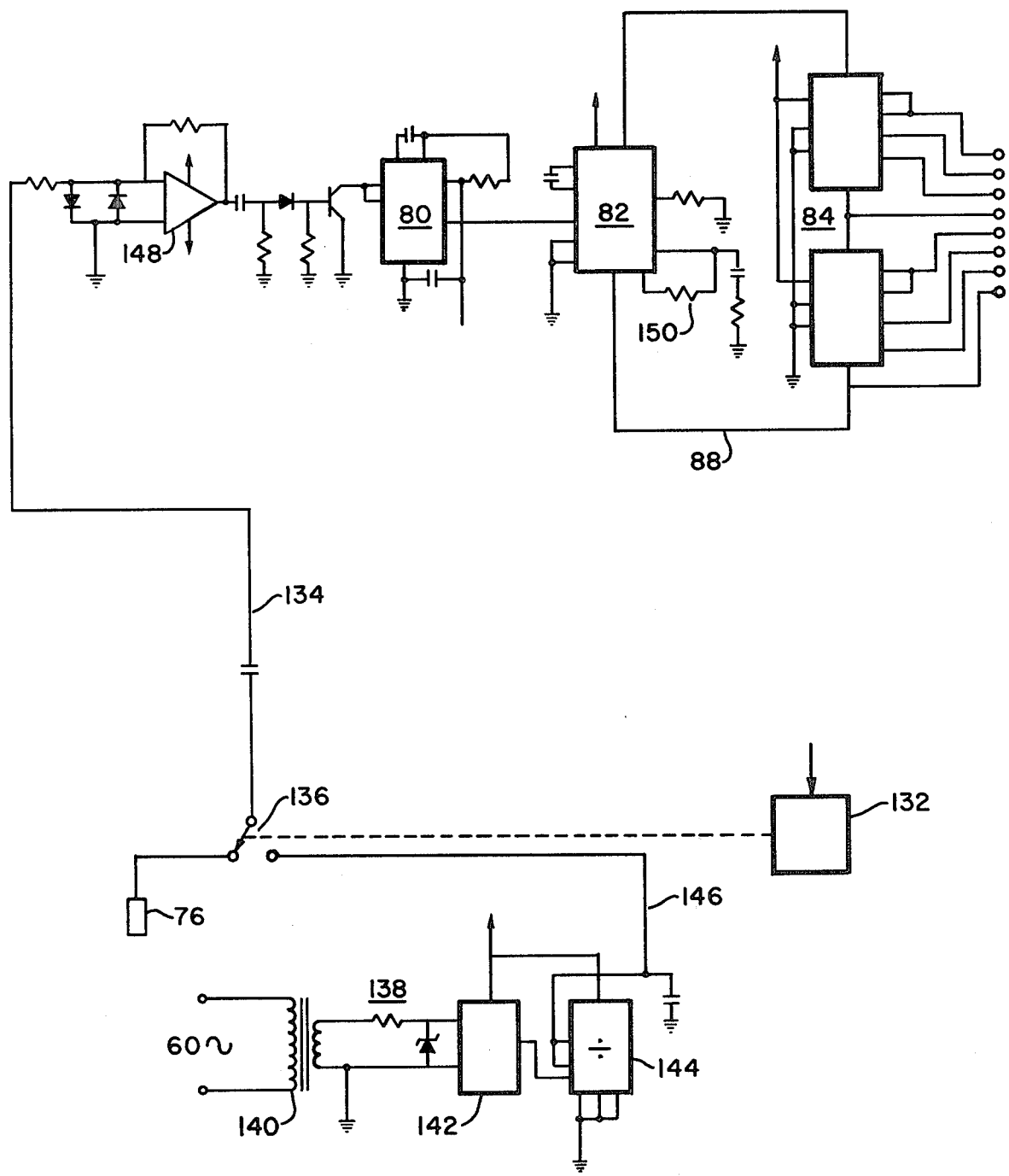
Figure 3B:
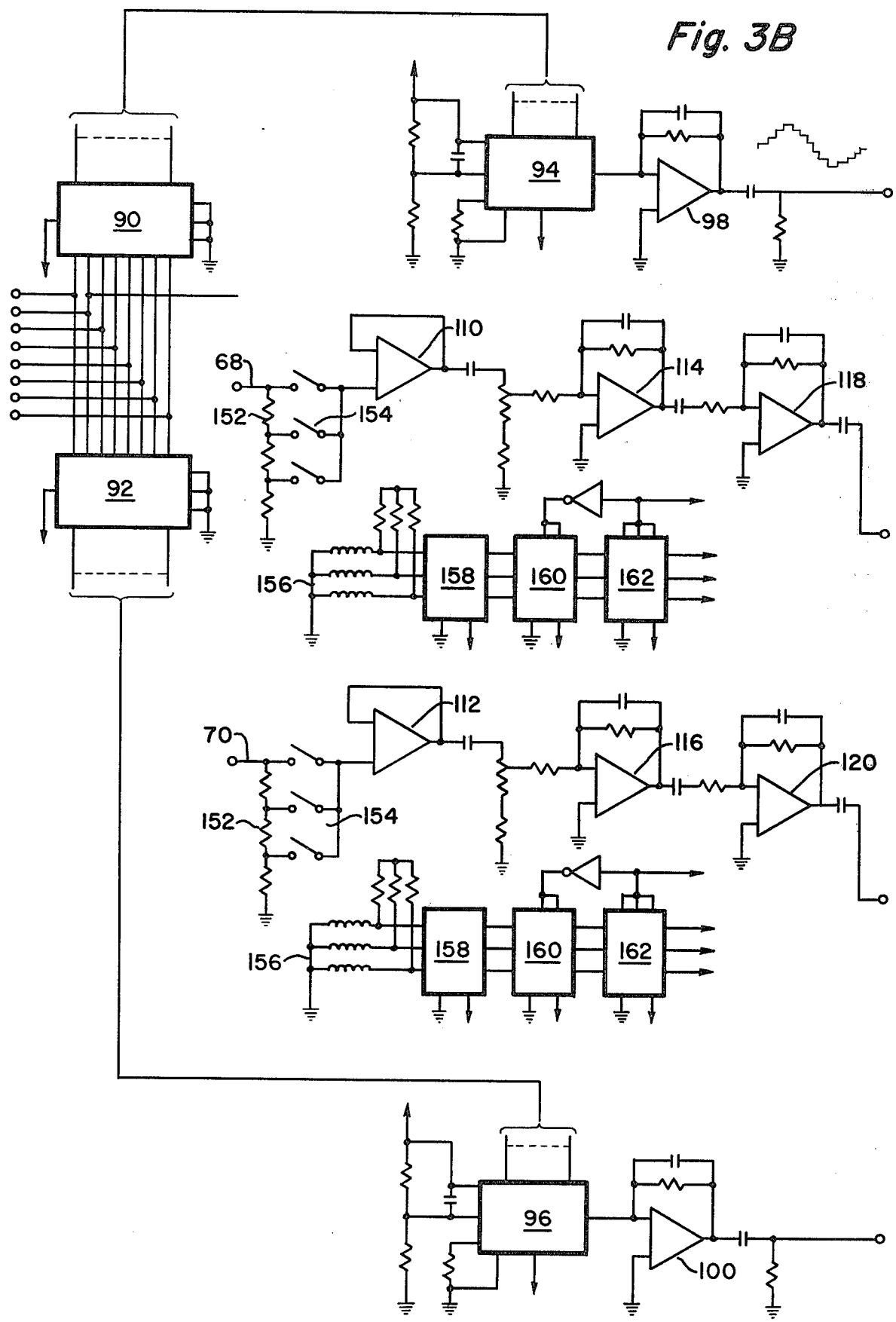
Figure 3C:
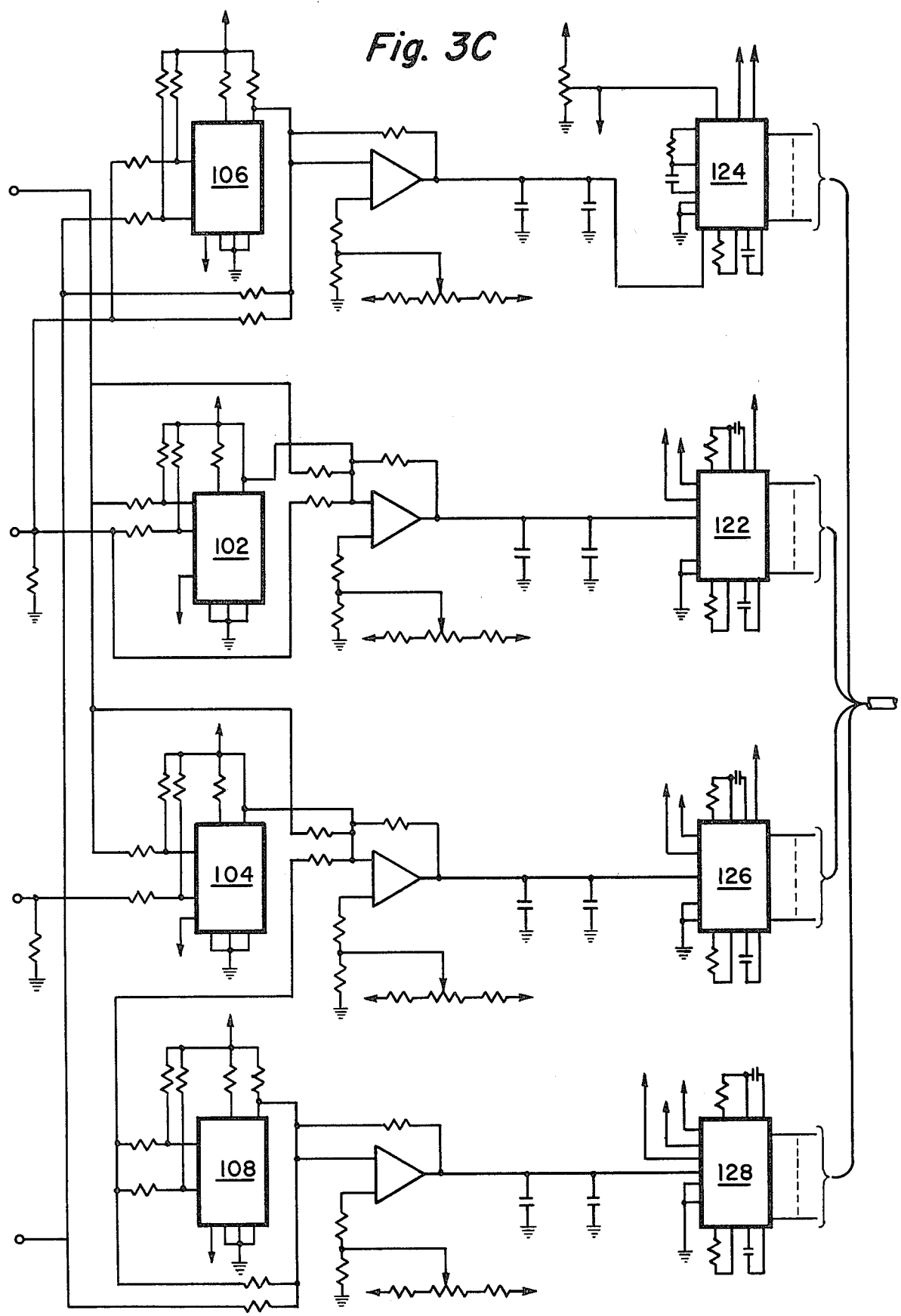
Figure 4:
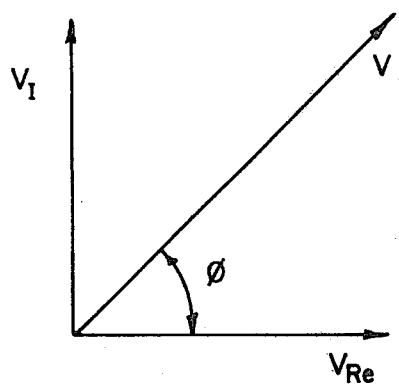

FIGS. 3A–3C, when placed side-by-side, comprise a schematic circuit diagram of certain portions of the circuitry shown in FIG. 2; and FIG. 4 is a schematic vector diagram depicting unbalance vectors.

Figure 1:
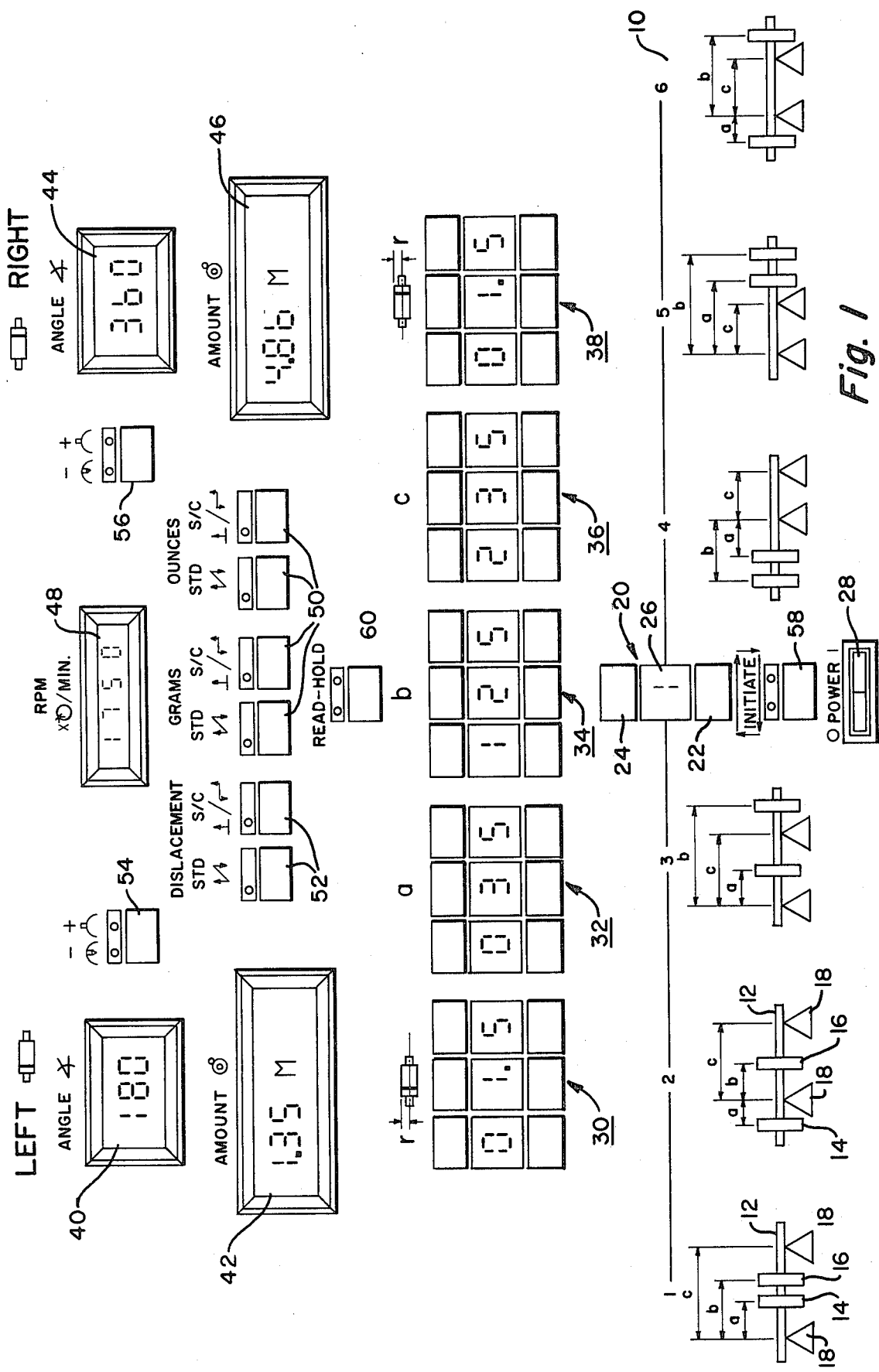
FIG. 1 is an elevational view of the control panel for the vibration analyzing apparatus of the invention.

With reference now to the drawings, and particularly to FIG. 1, there is shown the face of the control panel for the vibration analyzing apparatus of the invention. Provided on the front face 10 of the control panel are various balancing configurations numbered 1 through 6. In configuration 1, for example, rotor 12 having two balance planes 14 and 16 is supported between spaced bearings 18. In configuration 2, on the other hand, the two balance planes 14 and 16 are on opposite sides of one of the bearings 18. The balance planes 15 and 16 are those planes in which correction weights are to be added. In many rotors, balance weight attachment points, such as threaded holes, are spaced around the periphery of the rotor in each balance plane.

On each configuration are three dimensions a, b and c. Dimension a is the distance between one balance plane and the left bearing 18; dimension b is the distance between the other balance plane 16 and the bearing 18; and the dimension c is the spacing between the bearings 18. In setting up a balancing operation, an operator will initially determine which configuration is to be employed, depending upon the type of rotor which is to be balanced and the manner in which it is supported on the two spaced bearings 18. Provided on the front face 10 is a plurality of touch-advance digital switches, one of which is identified by the reference numeral 20 and is designated as a mode switch. While any type of switch may be used in accordance with the present invention, the touch-advance digital switches employed herein comprise a lower touch plate 22, an upper touch plate 24 and an intermediate light-emitting diode alphanumeric display 26. By momentarily touching the lower plate 22 four times, for example, the numeral displayed on the display 26 will advance through the numerals 1 through 4. On the other hand, the display may be reset to zero by simply touching the upper plate 24.

In the operation of the analyzing apparatus, the power switch 28 is turned ON; the proper configuration, 1 through 6, is selected; and after calibration about to be described, the lower plate of switch 20 is touched a number of times corresponding to the number above the selected configuration such that the number appearing in the display 26 will correspond to that of the configuration chosen. Above the mode switch 20 are five sets of switches 30, 32, 34, 36 and 38. Switches 32, 34 and 36 are utilized to introduce into the analyzing equipment the dimensions a, b and c for the particular configuration displayed on display 26. In the example given in FIG. 1, for example, dimension a comprises 3.5 inches, dimension b comprises 12.5 inches and dimension c comprises 23.5 inches. Switches 30 and 38 are utilized to incorporate into the analyzing equipment the radius r at which correction weights are to be added in the two correction planes 14 and 16. In the particular example given in FIG. 1, for example, this distance is 1.5 inches.

Above the switches 30–38 are left angle and amount digital displays 40 and 42, respectively and right angle and amount digital displays 44 and 46. At the top central portion of the panel is a digital RPM meter 48 which displays the speed of the rotor being balanced, usually in revolutions per minute. The amount of a correction weight is displayed in the displays 42 and 46 in either grams or ounces or static couple, depending upon which one of the switches 50 is activated. By touching one of the two switches 52, on the other hand, the meters or displays 42 and 46 will display vibration displacement in mils or microns. The displays 40 and 44 above displays 42 and 46 display the angle at which a correction weight should be added or the angle at which material should be removed from the correction plane at the radius r. If a weight is to be added, for example, the right side of touch switch 54 is contacted; whereupon the display 40 will indicate the angle from a reference point on the rotor at which a weight should be added. On the other hand, if the left side of touch switch 54 is contacted, the display 40 will indicate the angle, measured from the aforesaid reference point, at which material should be removed from the rotor so as to balance it. A similar switch 56 is provided for the right plane.

In carrying out a balancing operation, a single configuration 1 through 6 is initially selected and the dimensions then entered on switches 30-38. Thereafter, the initiate switch 58 is contacted; whereupon the system initially automatically calibrates itself. At the end of the calibration step, displays 42 and 46 indicate that the system is ready to start a balancing operation. After calibration, the rotor 62 is caused to rotate; whereupon displays 40-46 will read out the amounts and angles for vibration displacement in the left and right planes. The vibration analyzing system retains the information previously established by touching the read/hold switch 60. With the vibration displacement held, the rotor may be stopped. The correction amounts and angles may be displayed by touching the appropriate correction mode switch 50. Should it become necessary to change any one of the dimensions, 30, 32, 34, 36, 38, the correction call-out will instantly update itself with the correction.

With reference now to FIG. 2, elements shown therein which correspond to those of FIG. 1 are identified by like reference numerals at the upper right-hand side of the figure. A rotor to be balanced is indicated generally by the reference numeral 62 in FIG. 2. The system includes vibration pickups 64 and 66 each of which is adapted to produce a displacement vibration signal on lead 68 or 70 at a frequency corresponding to the speed of rotation of the rotor 62. Also adapted to be connected to the bearings, not shown, which support the rotor 62 are calibrating oscillators 72 and 74, each of which is adapted to oscillate one end of the rotor through a known displacement at a known calibration weight and a known radius. Above the rotor 62 is a speed transducer 76, such as a photocell, which is trained on a spot 78 on the rotor, the arrangement being such that each time the rotor rotates through one revolution, a pulse will be produced by the speed transducer 76. As will be understood, the frequency of these pulses corresponds to the speed of rotation of the rotor. The pulses from the speed transducer 76 are applied to the input of a one-shot multivibrator 80. The output of one-shot multivibrator 80, in turn, is applied to a voltage controlled oscillator connected in a phase locked loop with a counter 84. The voltage controlled oscillator 82 multiplies the frequency of the input pulses from the one-shot multivibrator 80 by 256; and the counter 84 counts these pulses and produces output digital signals on leads 86 representative of 256 times the input frequency. At the same time, a feedback on lead 88 from the counter 84 to the voltage controlled oscillator operates through a phase detector, in a manner hereinafter described, to lock the oscillator at a frequency of 256 times the input frequency of pulses from multivibrator 80.

The outputs from counter 84 on leads 86 are applied to a sine read-only memory 90 as well as a cosine read-only memory 92 which are simply read-only memories programmed to produce trig tables containing n-point sinusoids. The outputs of the two memory circuits, in turn, are applied to combination multipliers and digital-to-analog converters 94 and 96, respectively, which produce output sine wave signals represented as $V_R \sin \omega t$ and $V_R \cos \omega t$, respectively, where $\omega$ is the speed or rotation of the rotor 62. These are passed through high-pass filters 98 and 100, the $V_R \sin \omega t$ signals being applied to analog multipliers 102 and 104 and the $V_R \cos \omega t$ signals being applied to analog multipliers 106 and 108.

Reverting again to the upper left-hand corner of FIG. 2, the vibration displacement signals on leads 68 and 70 are applied through two buffer stages 110 and 112 to integrators 114 and 116, respectively. The outputs of the integrators, in turn, are applied through two high-pass filters 118 and 120, the output of filter 118 being applied to multipliers 102 and 106 and the output of filter 120 being applied to multipliers 104 and 108.

The output of filter 118 can be represented as:

$$V_u \sin(\omega t + \phi_R)$$

where $\phi_R$ represents the phase displacement of the right plane vibration signal from the signal $V_R \sin \omega t$ at the output of filter 98. The output of filter 120 can be represented as:

$$V_u \sin(\omega t + \phi_L)$$

where $\phi_L$ represents the phase displacement of the left plane vibration signal from the signal at the output of filter 98. In this regard, it will be appreciated that the angles $\phi_R$ and $\phi_L$ are those at which the unbalance points in the right and left planes are displaced from the mark 78 on rotor 62.

The multipliers 102-108 may be of the type manufactured by Analog Devices, Inc. and identified as their AD532 phasemeter. The two inputs to multiplier 102, for example, are:

$$V_u \sin(\omega t + \phi_R)$$

and $$V_R \sin \omega t$$

The output signal $E_o$ from the multiplier is represented by:

$$E_o = \frac{V_u V_R}{10} \sin \omega t (\sin \omega t \cos \phi_R + \cos \omega t \sin \phi_R)$$

or $$E_o = \frac{V_u V_R}{10} (\sin^2 \omega t \cos \phi_R + \sin \omega t \cos \omega t \sin \phi_R)$$

or

-continued
$$E_o = \frac{V_u V_R}{20} ([1 - \cos 2\omega t] \cos \phi_R + \sin 2\omega t \sin \phi_R)$$

When the vibration and reference signals are in phase:

$$E_o = \frac{V_u V_R}{20} \cos \phi_R = \frac{VV_R}{20}$$

However, when the two signals are not in phase, the voltage output varies as the sine function.

The operation of the multiplier 106 is the same as that of multiplier 102 except that the reference signal is now $V_R \cos \omega t$ rather than $V_R \sin \omega t$.

The outputs of multipliers 102 and 104 are filtered through low-pass filters 109 to produce direct current signals representative of the real amount of the unbalance in the right and left balancing planes; while the outputs of multipliers 106 and 108, after balancing in filters 111 comprise direct current signals proportional to the imaginary amount of the unbalance in the right and left balancing planes. This can best be understood from the vector diagram represented in FIG. 4. Referring to FIG. 4, V represents the absolute unbalance at an angle $\phi$ with respect to the mark 78 on the rotor 62 and $V_{Re}$ and $V_I$ represent the real and imaginary amounts of the unbalance at the outputs of the multipliers. From the two direct current signals representing the right angle vectors $V_{Re}$ and $V_I$, the amount and phase angle of the true or absolute unbalance vector V is calculated from straightforward trigonometric equations in the microprocessor 130.

It will be appreciated from the equations given above that while the multipliers 102-108 comprise phase detectors and produce output signals which are proportional to the phase difference between a reference signal and a vibration signal, they also act as synchronous filters. That is, when the quantity, $\omega$, in the expression $V_u \sin(\omega t + \phi)$ representing the vibration signal is not equal to the same quantity in the expression $V_R \sin \omega t$ or $V_R \cos \omega t$ representing the reference signal, the outputs of the multipliers will drop to zero. Consequently, only true vibration signals corresponding in frequency to the speed of rotation of the rotor will pass through the multipliers and all other frequencies will be filtered out.

The outputs of the low-pass filters 109 and 111 are applied through analog-to-digital converters 122 through 128; and the outputs of the converters 122-128 are applied to a microprocessor 130. Also applied to the microprocessor are the control signals from the various pushbutton switches on panel 125 previously described and the dimensions a, b and c and the radii r from the control panel 127. The output of the microprocessor is coupled to panel 127 as well as to the display panel 129 which contains the angle and amount meters previously described as well as the RPM meter 48 which is connected to the output of counter 84. The microprocessor 130 is also connected to a calibration circuit 131 which actuates the mechanical oscillators 74 and 84 to initially calibrate the system in a manner hereinafter described.

Let it be assumed that the radii r and the dimensions a, b and c for configuration 1 shown in FIG. 1 have been entered on the switches 30-38. To initially calibrate the system as described above, the initiation switch 58 shown in FIG. 1, which is connected to the microprocessor 130 of FIG. 2, is touched. At this time, the rotor 62 is not rotating.

With reference to FIG. 3A, the microprocessor 130 actuates a latch circuit 132 to disconnect lead 134 from speed transducer 76 and connect it, via switch 136, to calibration circuitry generally indicated by the reference numeral 138. The calibration circuitry 138 includes a transformer 140 connected to a 60-hertz input source, the secondary winding on transformer 140 being connected to a Schmitt-trigger circuit 142. The output of the Schmitt-trigger circuit 142, in turn, is connected to a divider 144 which divides by five, thereby producing on lead 146 a signal having a frequency at 12 hertz which is representative of 720 revolutions per minute of the rotor 62, this being the calibration speed assumed. The calibration signal on lead 134 is applied through an amplifier 148 to the one-shot multivibrator 80 previously described in connection with FIG. 2. The output of the one-shot multivibrator, in turn, is applied to the voltage controlled oscillator 82 coupled to counter 84 which feeds back a signal via the lead 88 to a phase detecting filter 150 incorporated into the voltage controlled oscillator 82 such that if the frequency at the output of the oscillator 82 should vary, the feedback on lead 88 will effect any necessary correction.

At the same time, the microprocessor 130, through circuit 131 shown in FIG. 2, initially causes the mechanical oscillator 74 for the right plane to oscillate the right end of the rotor 62 being balanced. The oscillator 74 effects an oscillation in the right end of the rotor through a known displacement at a known weight and radius. Similarly, the mechanical oscillator 72 for the left plane is next caused to oscillate. During the calibration step, the microprocessor performs the following calculations:

$$J_R = c \frac{(X_2 - X_{1ce})}{X_1 + X_2 - X_{1ce} - X_{2ce}} \quad (1)$$

$$J_L = c - J_R \quad (2)$$

$$A = X_{2ce} + (X_2 - X_{2ce}) \frac{c-b}{c} \frac{J_L}{J_R} \quad (3)$$

$$B = X_1 - (X_1 - X_{1ce}) \frac{a}{c} \quad (4)$$

$$C = X_2 - (X_2 - X_{2ce}) \frac{c-b}{c} \quad (5)$$

$$D = X_{1ce} + (X_1 - X_{1ce}) \frac{a}{c} \frac{J_R}{J_L} \quad (6)$$

$$W_L R_L = W_C R_C \frac{CX_L - AX_R}{BC - AD} \quad (7)$$

$$W_R R_R = W_C R_C \frac{BX_R - DX_L}{BC - AD} \quad (8)$$

In the foregoing equations, the various symbols have the following meanings:

$X_1$ = displacement in right plane under the influence of mechanical oscillator 74;

$X_{1ce}$ = cross-effect displacement in the left plane while the mechanical oscillator 74 is operative;

$X_2$ = displacement in left plane under the effect of oscillator 72;

$X_{2ce}$ = cross-effect in right plane from oscillator 72;

$J_R$ = the distance between the right support bearing and the center of gravity of the rotor;

$J_L$ = the distance between the left support bearing and the center of gravity of the rotor;

a, b and c correspond to the dimensions for a particular configuration shown in FIG. 1;

$W_C$ = known calibration weight;

$R_C$ = the radius at which the calibration rate is rotating to oscillate the rotor during calibration conditions;

$W_L$ and $W_R$ = the necessary correction weights for the left and right planes, respectively; and $R_L$ and $R_R$ = the radii at which the correction weights are to be added to the left and right planes, these corresponding to the radii r shown in FIG. 1.

It will be appreciated, of course, that only one oscillator 72 or 74 is actuated at any one time.

From the foregoing, it will be appreciated that once the system is calibrated, only the quantities $W_L$ and $W_R$ are unknown such that the microprocessor can solve Equations (7) and (8) above to determine the correction weights for the two correction planes selected. Once the system has been calibrated, the calibration weights will be displayed on the amount meters 42 and 46; and after the calibration has been completed, a signal will appear on the amount meters 42 and 46 indicating that calibration has been completed and that the system is now ready to start a balancing operation. At this point, the configuration 1 through 6 is set by the switch 20 and the rotor 62 is caused to rotate by manually actuating a drive motor, not shown. At this point, the foregoing equations are solved by the microprocessor 130 to indicate on the meters 42 and 46 the amount of unbalance in the two balance planes and the angles from the spot 78 on the rotor 62 at which the balance weights are to be added.

It will be noted in FIG. 3B that the leads 68 and 70 from the two vibration detectors 64 and 66 are connected to ground through a voltage divider 152, portions of which can be shunted by means of switches 154. The switches 154, in turn, are connected to three solenoid coils 156 whose energization is controlled by circuits 158, 160 and 162 which are, in turn, connected to the microprocessor 130 shown in FIG. 1. Depending upon the magnitude of the input diaplacement signal, one or more of the switches 154 will be properly actuated to establish the range of displacement signals which are displayed by the meters 42 and 46. In FIG. 3C, elements corresponding to those of FIG. 2 are identified by like reference numerals.

The procedure to be followed in an actual balancing operation is as follows:

(a) A balancing procedure is initiated by turning the power ON via switch 28 and by touching the initiate switch 58. This automatically clears the memory of the microprocessor 130 and causes the microprocessor, through the calibration circuit 131, to initially actuate one calibrating oscillator 72 or 74 followed by actuation of the other oscillator. During this time, the calibration quantities given in Equations (1) through (8) above are stored in the microprocessor's memory. When this operation is complete, the meters 42 and 46 will display the word "RUN".

(b) The balancing configuration of the part to be balanced (i.e., configurations 1 through 6 in FIG. 1) is then selected and the switch 20 pushed to advance the numeral displayed thereon to the proper configuration chosen.

(c) The actual dimensions a, b and c are then taken from the rotor being balanced and the push switches 32, 34 and 36 are advanced to indicate the measurements taken.

(d) The radii where the correction weights are to be added on the left and right sides of the rotor are then measured and entered on the switches 30 and 38. In English units, the radii are set to the nearest tenth of an inch; while in metric units, the radii must be in millimeters and set to the nearest millimeter.

(e) When all of the values have been entered on switches 30–38 and calibration is complete with the displays 42 and 46 indicating "RUN", the rotor 62 shown in FIG. 2 is brought up to the desired balancing speed by a motor and drive system, not shown. The actual rotational speed of the rotor is indicated on the display 48 shown in FIG. 1. During this time, the switch 60 is positioned to be in the "READ" mode; and the displays 42 and 46 indicate the actual amounts or magnitudes of the unbalance signals in the right and left planes and the displays will indicate the angles from reference point 78 at which weights should be added or removed, depending upon the state of switches 54 and 56.

(f) Initially, the amount readings on meters 42 and 46 will vacillate; however when the operator is satisfied that the vibrations are steady, he can capture them and cause them to be stored in the memory of microprocessor 130 by touching the switch 60 such that it is in the "HOLD" mode. The rotor 62 can now be stopped and need no longer be rotated. Since the amount and angle information is now stored in the microprocessor 130, corrections can be made to any of the dimensions displayed by the switches 30–38 without again rotating the rotor 62.

(g) Desired vibration and correction data are then displayed on the displays 42 and 44 by touching the appropriate switches 50 or 52.

(h) When placing a correction weight on the rotor 62, the angular location is found by rotating the phase reference mark on the rotor a number of degrees corresponding to that displayed by the left and right angle displays 40 and 42, in the direction of rotation. The correction weights can then be added or material removed from the top dead-center of the rotor depending upon the position of the (+ —) touch switches 54 and 56.

(i) After adding or subtracting weights in the right and left planes of the rotor being balanced, the operator causes the rotor 62 to again rotate and observes the readings on displays 40–46. In most cases, and because of the weights added may not be of exactly the desired weight or the angle at which they are placed on the rotor may vary slightly, there will be at least some residual vibration displayed on the displays. If this vibration magnitude, however, falls within permissible tolerances, the balancing operation is complete. If not, new vibration data is stored in the microprocessor 130 by pushing the switch 60 such that it is in the "HOLD" mode. Additional correction weights or removal of material can then be added as previously discussed until the vibration tolerance is met.

In certain cases, there may be only certain tapped holes equally spaced around the rotor into which correction weights can be threaded. Similarly, in the case of a bladed turbine, for example, the correction weight will have to be added to one of the blades since it cannot be supported in the space between them. The correction vector, however, may be located in-between blades or in-between tapped holes. In this case, it is desirable to resolve this single vector into two vectors which intersect the blades or the tapped holes. Assume, for example, that there are twelve tapped holes spaced around the left or right balancing plane, meaning that the holes are separated by 30°. Assume further that the correction vector is at an angle of 170° with respect to the reference point on the rotor. This means, of course, that the correction vector is at an angle of 10° with respect to the tapped hole diametrically opposite the mark on the rotor and 20° from the next tapped hole in the counterclockwise direction. With this information, the microprocessor can perform a single trigonometric computation to resolve the single vector into two vectors which intersect adjacent tapped holes or adjacent blades, as the case may be.

In order to perform the foregoing operation, the touch switch 20 is set to an arbitrary number other than 1 through 6; and in this case it will be assumed that in order to resolve the right plane vector into two, the switch 20 is set to "0". The microprocessor is programmed such that if the number of weight addition points is entered on switch 34 as shown in FIG. 1, the computer will automatically resolve the one vector into two vectors whose amounts and angles are displayed on the displays 40-46. The angles, of course, will correspond to the locations of two adjacent weight addition points in the left or right plane, as the case may be.

Alternatively, if it has been found necessary to add two correction weights to the rotor, it may be desirable to resolve these into one. Under these circumstances, the angles and amounts of the two correction weights in the left plane, for example, are manually recorded during the balancing operation. In order to resolve the two corrections into one, the touch switch 20 is arbitrarily advanced to "7", for example. Thereafter, the read-/hold switch 60 is set to the "HOLD" mode and the standard gram switch 50 is set to the "ON" position. At this point, the magnitude of one of the two correction vectors is entered in touch switch 30; while the angle of the vector is entered on touch switch 32. The microprocessor 130 is programmed such that these amounts will now be displayed on the right displays 44 and 46. The touch switch 60 is now actuated to assume the "READ" mode; and the information is stored in the microprocessor memory. At the same time, the microprocessor is programmed to transfer the angle and amount of the aforesaid first vector to the left displays 40 and 42. The magnitude and angle of the second vector is now entered on switches 30 and 32 as before; and the switch 60 again set to the "READ" mode. Stored in the memory of the microprocessor 130 are now the amounts and angles of the two vectors. Again, by a relatively simple trigonometric computation, the sum of the two vectors is computed in the microprocessor and now displayed on the left displays 40 and 42. It is, of course, well within the skill of the art to program the microprocessor 130 to perform the foregoing calculations.

Although the invention has been shown in connection with a certain specific embodiment, it will be readily apparent to those skilled in the art that various changes in form and arrangement of parts may be made to suit requirements without departing from the spirit and scope of the invention.

We claim:

1. In electronic balancing apparatus for carrying out the balancing analysis of a rotatable body in conjunction with the rotation thereof at a given rate upon a support structure having calibration vibrator means associated therewith energizable to impart an oscillation of predetermined dynamic characteristic to said body at predetermined positions with respect to said support structure and having transducer means associated with said support structure for deriving vibration responsive signals, the improvement characterized by:

rotation monitoring means spaced from said body and having a pulse characterized output corresponding with the rotation of a given position on said body;

counter means having a predetermined digital characterized output in response to said pulse characterized output;

first and second memory means respectively retaining sine and cosine data and addressable by said counter means digital characterized output to derive respective first and second digital characterized trigonometric outputs;

first converter means responsive to said first and second trigonometric outputs for deriving first and second analog reference outputs respectively corresponding therewith;

multiplier means responsive to said vibration signals and said first and second reference outputs for deriving first and second phase related signals;

second converter means for converting said first and second phase related signals respectively to first and second digital signals;

processor means responsive to said first and second digital signals for computing vector categorized balance deriving weight and position data and providing readout signals corresponding therewith; and readout means responsive to said readout signals for providing visual digital readouts representing balance deriving weight and position information.

2. The apparatus of claim 1 wherein said processor means is initially actuable to effect the selective energization of said calibration vibrator means while, simultaneously, effecting the application of a calibrating frequency signal to said counter means to effect the derivation of first and second digital calibrating signals by said second converter means, said processor means including random access memory for selectively retaining said first and second digital calibrating signals and carrying out said computation with respect thereto.

3. The apparatus of claim 1
including geometric data input switch means manually actuable to provide selected dimensional data signals corresponding with select dimensional parameters of the geometry of said rotatable body with respect to said support structure; and
said processor means retains said dimensional data signals within random access memory for carrying out said computation with respect thereto.

4. The apparatus of claim 3 in which said processor means retains said first and second digital signals in random access memory and is responsive to said geometric data input switch means actuation to alter said retention of said selected dimensional data signals with respect to said actuation and recompute said data to provide revised said readout signals.

5. The apparatus of claim 1 including hold switch means manually actuable to effect the insertion by said processor means of said first and second digital signals into memory.

6. The apparatus of claim 1
including geometric data input switch means manually actuable to provide selected dimensional data signals corresponding with select dimensional parameters of the geometry of said rotatable body with respect to said support structure; and said processor means is initially operative to effect the select energization of said calibration vibrator means while, simultaneously, effecting the application of a calibrating frequency signal to said counter means to effect the derivation of first and second digital calibrating signals by said converter means, said processor means including memory means for selectively retaining said first and second digital calibrating signals and for retaining said dimensional data signals for carrying out said computation with respect thereto.

7. The apparatus of claim 6 in which said processor means retains said first and second digital signals in memory and is responsive to said geometric data input switch means alteration to alter said retention of said selected dimensional data signals with respect to said actuation and recompute said data to provide revised said readout signals.

8. The apparatus of claim 7 including hold switch means manually actuable to effect the insertion by said processor means of said first and second digital signals into memory.

9. In electronic balancing apparatus for carrying out the dual plane aspect balancing analysis of a rotatable body in conjunction with the rotation thereof at a given rotational frequency upon a support structure, said structure having calibration vibrator means associated therewith energizable to impart an oscillation of predetermined dynamic characteristic to said body and transducer means associated with said support structure for deriving vibration responsive signals, the improvement characterized by:

analyzer network means including means defining a filter synchronous with said body rotational frequency and responsive to said vibration responsive signals for deriving first and second phase related signals;

converter means for converting said first and second phase related signals, respectively, to first and second digital signals;

geometric data input switch means manually actuable to provide selected dimensional data signals corresponding with select dimensional parameters of the geometry of said rotatable body with respect to said support structure;

processor means for selectively recepting said first and second digital signals into random access memory and responsive thereto and to said dimensional data signals for computing vector categorized balance deriving weight and position data and providing readout signals corresponding therewith and further responsive to subsequent said geometric data input switch means actuation to alter said retention of said selected dimensional data signals with respect to said actuation and recompute said data to provide revised said readout signals; and readout means responsive to said readout signals for providing visual digital readouts representing balance deriving weight and position information.

10. The apparatus of claim 9 including hold switch means manually actuable to effect the insertion by said processor means of said first and second digital signals into memory.

11. The apparatus of claim 9 wherein said processor means is initially actuable to effect the selective energization of said calibration vibrator means while, simultaneously, effecting the application of a calibrating frequency signal to said analyzer network means filter to effect the derivation of first and second digital calibrating signals by said converter means, said processor means retaining said first and second digital calibrating signals in said memory and carrying out said computation with respect thereto and with respect to said first and second digital signals.

12. The apparatus of claim 11 including hold switch means manually actuable to effect the insertion by said processor means of said first and second digital signals into memory.

13. The apparatus of claim 9 including vector adjustment switch means actuable to provide a vector split command signal; and said processor means is responsive to said vector split command signal to derive revised readout signals corresponding with the resolution of the vector values represented by said first and second digital signals into two vector values corresponding with a selected said dual plane aspect of said rotatable body.

14. In electronic balancing apparatus for carrying out the dual plane aspect balancing analysis of a rotatable body in conjunction with the rotation thereof at a given rotational frequency upon a support structure, said apparatus having transducer means associated with said support structure for deriving unbalance responsive signals, the improvement characterized by:

analyzer network means including means defining a filter synchronous with said body rotational frequency and responsive to said unbalance responsive signals for deriving first and second phase related signals;

converter means for converting said first and second phase related signals, respectively, to first and second digital signals;

geometric data input switch means manually actuable to provide selected dimensional data signals corresponding with select dimensional parameters of the geometry of said rotatable body with respect to said support structure;

processor means for selectively recepting said first and second digital signals into random access memory and responsive thereto and to said dimensional data signals for computing vector categorized balance deriving weight and position data and providing readout signals corresponding therewith and further responsive to subsequent said geometric data input switch means actuation to alter said retention of said selected dimensional data signals with respect to said actuation and recompute said data to provide revised said readout signals; and readout means responsive to said readout signals for providing visual digital readouts representing balance deriving weight and position information.

15. The apparatus of claim 14 in which said analyzer network means comprises:

rotation monitoring means spaced from said body and having a pulse characterized output corresponding with the rotation of a given position on said body;

counter means having a predetermined digital characterized output in response to said pulse characterized output;

first and second memory means respectively retaining sine and cosine data and addressable by said counter means digital characterized output to derive respective first and second digital characterized trigonometric outputs;

second converter means responsive to said first and second trigonometric outputs for deriving first and second analog reference outputs respectively corresponding therewith; and multiplier means responsive to said unbalance responsive signals and to said first and second reference outputs for deriving said first and second phase related signals.

* * * * *